US012763799B2

(12) United States Patent
Pehlke

(10) Patent No.: US 12,763,799 B2
(45) Date of Patent: Oct. 13, 2026

(54) CIRCUITS FOR FILTERING RADIO-FREQUENCY SIGNALS

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 687 days.

(21) Appl. No.: 17/982,273

(22) Filed: Nov. 7, 2022

(65) Prior Publication Data

US 2023/0144780 A1 May 11, 2023

Related U.S. Application Data

(60) Provisional application No. 63/276,796, filed on Nov. 8, 2021.

(51) Int. Cl.
*H04B 1/00* (2006.01)

(52) U.S. Cl.
CPC .................................. *H04B 1/0057* (2013.01)

(58) Field of Classification Search
CPC ....... H04B 1/0057; H04B 1/006; H04B 1/406
See application file for complete search history.

(56) References Cited

U.S. PATENT DOCUMENTS 5,880,921 A 3/1999 Tham et al.
6,232,847 B1 5/2001 Marcy et al.
6,750,737 B2 6/2004 Uriu et al.
7,133,646 B1 * 11/2006 Miao ........................ H04B 1/38 455/73
7,808,342 B2 10/2010 Prikhodko et al.
7,839,234 B2 11/2010 Prikhodko et al.
8,315,577 B2 * 11/2012 Kemmochi ............ H04B 1/006 455/78
8,369,250 B1 * 2/2013 Khlat .................. H04B 1/0057 370/280
9,572,052 B2 2/2017 King et al.
9,621,327 B2 4/2017 Chang et al.
9,866,268 B2 1/2018 King et al.
9,866,366 B2 1/2018 Pehlke
9,948,348 B2 4/2018 Nohra et al.
9,991,918 B2 6/2018 King et al.
10,014,889 B2 7/2018 King et al.
10,050,529 B2 8/2018 Pehlke et al.
10,069,615 B2 9/2018 Chang et al.
10,075,199 B2 9/2018 King et al.
10,135,469 B2 11/2018 Chang et al.

(Continued)

*Primary Examiner* — Yuwen Pan
*Assistant Examiner* — Rui M Hu
(74) *Attorney, Agent, or Firm* — Knobbe, Martens, Olson & Bear, LLP

(57) ABSTRACT

Embodiments of the invention relate to a switching circuit that includes a first signal path for a first frequency range, a second signal path for a second frequency range, and one or more switches. Each of the first and second signal paths may include one or more filters configured to pass a respective region of the first or second frequency ranges. The one or more switches are configured to select one or more signal path filters based on a control signal. Related methods for filtering a radio-frequency signal, radio-frequency modules and wireless devices are also provided.

20 Claims, 11 Drawing Sheets

(56) References Cited

U.S. PATENT DOCUMENTS

| | | | | |
|---|---|---|---|---|
| 10,211,857 | B2 | 2/2019 | King et al. | |
| 10,256,794 | B2 | 4/2019 | Srirattana et al. | |
| 10,333,578 | B2 * | 6/2019 | Solomko | H04B 1/401 |
| 10,340,961 | B2 | 7/2019 | King et al. | |
| 10,374,555 | B2 | 8/2019 | Pehlke et al. | |
| 10,374,650 | B2 | 8/2019 | Pehlke et al. | |
| 10,432,274 | B2 | 10/2019 | Pehlke | |
| 10,447,317 | B2 | 10/2019 | Chang et al. | |
| 10,447,458 | B2 * | 10/2019 | Chang | H04L 5/001 |
| 10,454,506 | B2 | 10/2019 | King et al. | |
| 10,498,521 | B2 | 12/2019 | Little | |
| 10,560,139 | B2 | 2/2020 | Brunel et al. | |
| 10,581,466 | B2 | 3/2020 | Pehlke | |
| 10,587,291 | B2 | 3/2020 | Pehlke et al. | |
| 10,644,861 | B2 | 5/2020 | Pehlke | |
| 10,951,173 | B2 | 3/2021 | Pehlke et al. | |
| 11,038,543 | B2 | 6/2021 | Chang et al. | |
| 11,128,323 | B2 * | 9/2021 | Pehlke | H04B 1/0057 |
| 11,309,946 | B2 | 4/2022 | Pehlke | |
| 11,349,504 | B2 | 5/2022 | Pehlke | |
| 11,374,538 | B2 | 6/2022 | Drogi et al. | |
| 11,387,797 | B2 | 7/2022 | Drogi et al. | |
| 11,405,059 | B2 | 8/2022 | Pehlke | |
| 11,476,815 | B2 | 10/2022 | Drogi et al. | |
| 12,425,058 | B2 * | 9/2025 | Uejima | H04B 1/0483 |
| 2008/0079513 | A1 | 4/2008 | Prikhodko et al. | |
| 2008/0079514 | A1 | 4/2008 | Prikhodko et al. | |
| 2009/0310591 | A1 * | 12/2009 | Feher | H04M 11/04 370/347 |
| 2010/0197235 | A1 * | 8/2010 | Wilhelmsson | H04W 72/02 455/63.3 |
| 2011/0116490 | A1 * | 5/2011 | Wilhelmsson | H04W 16/14 370/343 |
| 2011/0294443 | A1 | 12/2011 | Nohra et al. | |
| 2012/0129457 | A1 * | 5/2012 | Linsky | H04W 16/14 455/63.3 |
| 2012/0307749 | A1 * | 12/2012 | Banister | H04B 1/0475 370/329 |
| 2013/0225107 | A1 * | 8/2013 | Lane | H04B 1/0458 455/234.1 |
| 2013/0265912 | A1 * | 10/2013 | Ikonen | H01Q 1/243 370/278 |
| 2014/0024322 | A1 * | 1/2014 | Khlat | H04B 7/0602 455/78 |
| 2014/0038667 | A1 * | 2/2014 | Little | H04B 1/006 455/553.1 |
| 2014/0119245 | A1 * | 5/2014 | Desjardins | H04B 1/0057 370/278 |
| 2014/0194155 | A1 * | 7/2014 | Ko | H04B 1/406 455/552.1 |
| 2014/0307836 | A1 * | 10/2014 | Khlat | H04B 1/04 375/343 |
| 2015/0036656 | A1 * | 2/2015 | McCarthy | H04B 7/0689 370/331 |
| 2015/0133067 | A1 * | 5/2015 | Chang | H04B 1/006 455/78 |
| 2015/0373711 | A1 * | 12/2015 | Narathong | H04B 1/0057 370/280 |
| 2016/0006556 | A1 * | 1/2016 | Pehlke | H04B 1/0057 370/280 |
| 2016/0020737 | A1 * | 1/2016 | Kong | H01Q 21/28 330/250 |
| 2016/0044677 | A1 | 2/2016 | King et al. | |
| 2016/0134414 | A1 | 5/2016 | Pehlke | |
| 2016/0241026 | A1 | 8/2016 | Pehlke | |
| 2016/0241294 | A1 | 8/2016 | Pehlke et al. | |
| 2017/0026074 | A1 | 1/2017 | King et al. | |
| 2017/0111066 | A1 | 4/2017 | King et al. | |
| 2017/0111074 | A1 | 4/2017 | King et al. | |
| 2017/0141759 | A1 | 5/2017 | Srirattana et al. | |
| 2017/0195106 | A1 | 7/2017 | Pehlke | |
| 2017/0222665 | A1 | 8/2017 | Chang et al. | |
| 2017/0222666 | A1 * | 8/2017 | Hyun | H01Q 19/185 |
| 2017/0244538 | A1 | 8/2017 | Chang et al. | |
| 2017/0338839 | A1 * | 11/2017 | Little | H04B 1/56 |
| 2018/0019768 | A1 | 1/2018 | King et al. | |
| 2018/0063031 | A1 * | 3/2018 | Wloczysiak | H04B 1/0057 |
| 2018/0076774 | A1 | 3/2018 | Pehlke et al. | |
| 2018/0131500 | A1 | 5/2018 | Pehlke | |
| 2018/0131501 | A1 | 5/2018 | Little | |
| 2018/0152945 | A1 * | 5/2018 | Balteanu | H04L 5/001 |
| 2018/0205530 | A1 | 7/2018 | Pehlke | |
| 2018/0337706 | A1 * | 11/2018 | Yamazaki | H04B 1/50 |
| 2018/0367173 | A1 | 12/2018 | King et al. | |
| 2019/0007073 | A1 * | 1/2019 | King | H04B 1/0057 |
| 2019/0013836 | A1 | 1/2019 | Pehlke et al. | |
| 2019/0097661 | A1 | 3/2019 | Chang et al. | |
| 2019/0123769 | A1 | 4/2019 | Pehlke et al. | |
| 2019/0123770 | A1 * | 4/2019 | Pehlke | H04B 1/40 |
| 2019/0149178 | A1 | 5/2019 | King et al. | |
| 2019/0158137 | A1 | 5/2019 | Brunel et al. | |
| 2019/0181907 | A1 * | 6/2019 | Pfann | H03H 9/547 |
| 2019/0245439 | A1 | 8/2019 | Pehlke et al. | |
| 2019/0280669 | A1 * | 9/2019 | Mori | H04B 1/50 |
| 2019/0306805 | A1 * | 10/2019 | Hasnain | H04W 88/10 |
| 2019/0334563 | A1 * | 10/2019 | Elbrecht | H04B 1/0057 |
| 2020/0036406 | A1 | 1/2020 | Pehlke et al. | |
| 2020/0106463 | A1 | 4/2020 | Chang et al. | |
| 2020/0106497 | A1 | 4/2020 | Pehlke | |
| 2020/0153413 | A1 * | 5/2020 | Mori | H03H 9/605 |
| 2020/0154434 | A1 * | 5/2020 | Balteanu | H03F 1/565 |
| 2020/0162029 | A1 | 5/2020 | Pehlke et al. | |
| 2020/0162114 | A1 | 5/2020 | King et al. | |
| 2020/0220635 | A1 * | 7/2020 | Tahara | H03K 17/164 |
| 2020/0328729 | A1 * | 10/2020 | Jo | H03H 11/28 |
| 2020/0336110 | A1 | 10/2020 | Drogi et al. | |
| 2020/0350878 | A1 | 11/2020 | Drogi et al. | |
| 2020/0366320 | A1 * | 11/2020 | An | H04B 1/44 |
| 2020/0412403 | A1 * | 12/2020 | Pehlke | H04L 5/14 |
| 2021/0058115 | A1 * | 2/2021 | Yu | H04B 1/0057 |
| 2021/0111742 | A1 * | 4/2021 | Hitomi | H04B 1/0064 |
| 2021/0119592 | A1 | 4/2021 | Drogi et al. | |
| 2021/0135690 | A1 | 5/2021 | Pehlke | |
| 2021/0143852 | A1 | 5/2021 | Pehlke | |
| 2021/0159925 | A1 * | 5/2021 | Mori | H04B 1/0067 |
| 2021/0184707 | A1 * | 6/2021 | Hasnain | H04B 1/0053 |
| 2021/0218370 | A1 | 7/2021 | Balteanu et al. | |
| 2021/0218422 | A1 * | 7/2021 | Pehlke | H04B 1/40 |
| 2021/0218424 | A1 | 7/2021 | Pehlke | |
| 2021/0218434 | A1 * | 7/2021 | Pehlke | H04L 5/14 |
| 2021/0273670 | A1 * | 9/2021 | Yasuda | H04B 1/1615 |
| 2021/0384925 | A1 * | 12/2021 | Nagamori | H04B 1/00 |
| 2022/0014165 | A1 * | 1/2022 | Cai | H03H 9/703 |
| 2022/0069850 | A1 | 3/2022 | Loh et al. | |
| 2022/0094373 | A1 * | 3/2022 | Tsuchida | H03F 1/56 |
| 2022/0103192 | A1 | 3/2022 | Pehlke | |
| 2022/0103193 | A1 | 3/2022 | Pehlke | |
| 2022/0132606 | A1 * | 4/2022 | Hasnain | H04W 72/542 |
| 2022/0182084 | A1 | 6/2022 | King et al. | |
| 2022/0182085 | A1 | 6/2022 | King et al. | |
| 2022/0231710 | A1 | 7/2022 | Pehlke | |
| 2022/0255574 | A1 | 8/2022 | Harrison | |
| 2022/0294400 | A1 | 9/2022 | Cao et al. | |
| 2022/0320751 | A1 | 10/2022 | Pehlke et al. | |
| 2022/0328980 | A1 | 10/2022 | Dicarlo et al. | |
| 2022/0328982 | A1 * | 10/2022 | Kim | H04B 1/0053 |
| 2022/0329266 | A1 | 10/2022 | Pehlke | |
| 2022/0399909 | A1 * | 12/2022 | Krishnamachari | H04B 1/0078 |
| 2023/0077767 | A1 * | 3/2023 | Beaudin | H04B 1/0057 455/552.1 |
| 2023/0179235 | A1 * | 6/2023 | Kitajima | H04B 1/0057 375/219 |
| 2023/0216535 | A1 * | 7/2023 | Wang | H04B 1/525 455/78 |

* cited by examiner

CIRCUITS FOR FILTERING RADIO-FREQUENCY SIGNALS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the disclosure relate to the field of wireless communication devices, and more particularly, to front end modules for multiple frequency bands.

Description of the Related Technology

Front-end modules of wireless communication devices are typically configured to condition (for instance, filter and/or amplify) received radio-frequency (RF) signals. The RF signals can be cellular signals, wireless local area network signal (WLAN), e.g., Wi-Fi signals, or the like. Since multiple frequency bands can exist close to each other, the front-end module can be configured to separate frequencies bands adjacent to each other.

Front-end modules can be used for transmitting and/or receiving signals of a wide range of frequencies. For example, a front-end modules can be used to wirelessly communicate RF signals in a frequency range of about 30 kHz to 300 GHz, such as in the range of about such as in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

Examples of RF communication systems with front-end modules include, but are not limited to, mobile phones, tablets, base stations, network access points, customer-premises equipment (CPE), laptops, and wearable electronics.

SUMMARY

According to one embodiment there is provided a radio-frequency switching circuit for multiple signal bands comprising a first signal path for a first frequency range, a second signal path for a second frequency range, the first and second frequency ranges being adjacent to each other, one or more second signal path filters each configured to pass a respective region of the second frequency range, at least one of the respective regions being smaller than the second frequency range, and one or more switches configured to select one of the second signal path filters based on a control signal.

In one example the first frequency range includes one or more frequency bands used for cellular communication and wherein the second frequency range includes a frequency band used for WLAN communication.

In one example the first frequency range includes a frequency band used for WLAN communication and wherein the second frequency range includes one or more frequency bands used for cellular communication.

In one example the first or second frequency ranges includes a frequency band used for WLAN communication having a frequency range of between 2403 MHz to 2483.5 MHz, or 5150 MHz to 5850 MHz, or 5925 MHz to 7125 MHz.

In one example the first frequency range is separated from the second frequency range by a frequency gap that is smaller than or equal to approximately 15 MHz.

In one example the region of the second frequency range corresponding to the selected second signal path filter is separated from the first frequency range by a frequency gap that is greater than or equal to 20 MHz, 32 MHz, 33 MHz, 37 MHz or 40 MHz.

The one or more second signal path filters can include at least first and second signal path filters configured to pass first and second respective regions of the second frequency range, each of the first and second respective regions being smaller than the second frequency range.

The first frequency range can include a first band lower than the second frequency range and a second band higher than the second frequency range. A lower end of the first region of the second frequency range can be separated from an upper end of the first band of the first frequency range by a frequency gap that is greater than a gap between the upper end of the first band and a lower end of the second frequency range. An upper end of the second region of the second frequency range can be separated from a lower end of the second band of the first frequency range by a frequency gap that is greater than a gap between the lower end of the second band and an upper end of the second frequency range.

In one example a first region of the second frequency range includes frequencies between 2532 MHz to 2463 MHz.

In one example a second region of the second frequency range includes frequencies between 2443 MHz to 2483 MHz.

In one example a third region of the second frequency range includes frequencies between 2423 MHz to 2483 MHz.

Another example further comprises a mode select switch configured to provide the signals from the selected second signal path filter to an output node.

According to another embodiment there is provided a radio-frequency switching circuit comprising a first signal path for a first frequency range, a second signal path for a second frequency range, the first and second frequency ranges being adjacent to each other, one or more first signal path filters each configured to pass a respective region of the first frequency range, at least one of the respective regions of the first frequency range being smaller than the first frequency range, one or more second signal path filters each configured to pass a respective region of the second frequency range, at least one of the respective regions being smaller than the second frequency range, and one or more switches configured to select one or more of the first signal path filters and the second signal path filters based on a control signal.

In one example the first frequency range includes one or more frequency bands used for cellular communication and wherein the second frequency range includes a frequency band used for WLAN communication.

In one example the second frequency range includes a frequency band used for WLAN communication having a frequency range of between 2403 MHz to 2483.5 MHz, or 5150 MHz to 5850 MHz, or 5925 MHz to 7125 MHz.

In one example the first frequency range is separated from the second frequency range by a frequency gap that is smaller than or equal to approximately 15 MHz.

In one example the region of the first frequency range corresponding to the selected first signal path filter is separated from the second frequency range by a frequency gap that is greater than or equal to 20 MHz, 32 MHz, 33 MHz, 37 MHz or 40 MHz.

In one example the region of the second frequency range corresponding to the selected second signal path filter is separated from the first frequency range by a frequency gap that is greater than or equal to 20 MHz, 32 MHz, 33 MHz, 37 MHz or 40 MHz.

The one or more first signal path filters can include at least first and second signal path filters configured to pass first and second respective regions of the first frequency range, each of the first and second respective regions being smaller than the first frequency range. The one or more second signal path filters include at least third and fourth signal path filters configured to pass third and fourth respective regions of the second frequency range, each of the third and fourth respective regions being smaller than the second frequency range. The third and fourth respective regions of the second frequency range can be between a first band of the first frequency range and a second band of the first frequency range.

In one example a first region of the first frequency range includes frequencies between 2300 MHz to 2370 MHz and between 2515 MHz to 2675 MHz.

In one example a first region of the second frequency range includes frequencies between 2532 MHz to 2463 MHz.

In one example a second region of the second frequency range includes frequencies between 2443 MHz to 2483 MHz.

In one example a third region of the second frequency range includes frequencies between 2423 MHz to 2483 MHz.

Another example further comprises a mode select switch for each of the first and second signal paths, each mode select switch configured to provide the signals from the respective signal path filter to a respective output node.

According to another embodiment there is provided a method for filtering a radio-frequency signal comprising receiving a first frequency range and a second frequency range, the first and second frequency ranges being adjacent to each other, providing the first frequency range to a first signal path having one or more first signal path filters that each pass a respective region of the first frequency range, at least one of the respective regions of the first frequency range being smaller than the first frequency range, providing the second frequency range to a second signal path having one or more second signal path filters that each pass a respective region of the second frequency range, at least one of the respective regions being smaller than the second frequency range, and in response to receiving a control signal, selecting one or more of the first signal path filters and the second signal path filters.

According to another embodiment there is provided a radio-frequency module comprising a packaging substrate configured to receive a plurality of components, and a semiconductor die implemented on the packaging substrate, the semiconductor die including a radio-frequency switching circuit comprising a first signal path for a first frequency range, a second signal path for a second frequency range, the first and second frequency ranges being adjacent to each other, one or more second signal path filters each configured to pass a respective region of the second frequency range, at least one of the respective regions being smaller than the second frequency range, and one or more switches configured to select one of the second signal path filters based on a control signal.

According to another embodiment there is provided a wireless device comprising an antenna port coupled to one or more antennas, an antenna switch module, a radio-frequency module, the radio-frequency module including a radio-frequency switching circuit comprising a first signal path for a first frequency range, a second signal path for a second frequency range, the first and second frequency ranges being adjacent to each other, one or more second signal path filters each configured to pass a respective region of the second frequency range, at least one of the respective regions being smaller than the second frequency range, and one or more switches configured to select one of the second signal path filters based on a control signal, and a controller configured to provide a control signal to the radio-frequency switching circuit.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
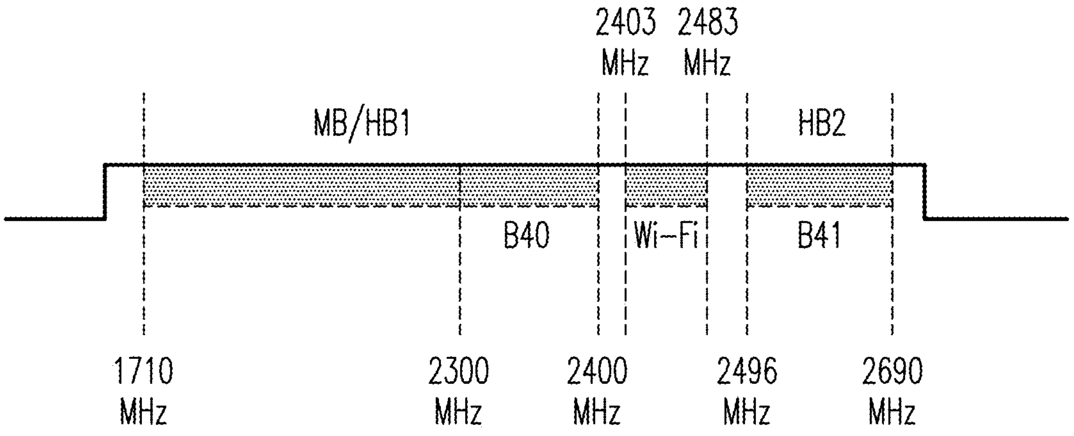
FIG. 1 is a schematic diagram showing example frequency bands for use in wireless communications.

Aspects and embodiments described herein are directed to a switching circuit for filtering radio-frequency signals in two adjacent frequency ranges. The switching circuit may select a filter path to provide a sub-range of frequencies for at least one of the frequency ranges. This can advantageously enables a larger frequency separation between signals in the first frequency range and signals in a second frequency range thereby attenuating emissions and insertion loss and improving the coexistence of both signals on a transmission line as further described below.

Shared use of antennas is often facilitated in existing radio architectures through the use of "antenna plexers", which include banks of filters that enable a filtered merge of many signals in different frequency ranges to a single common antenna feed for a broadband antenna supporting all those bands. These are implemented in a variety of filter technologies, such as low temperature co-fired ceramic technology (LTCC), integrated passive device technology (IPD), discrete surface-mount technology (SMT), or a combination of those for purely L-C-based filters. As the filter band groups of these ganged band pass filters get closer together in frequency offset, the corner frequency roll-off of the band pass filters, which designed in-band from out-of-band (OOB), starts to have more impact in increasing in-band insertion loss at the band edges, and the loading loss of the filters becomes worse as well as the band pass filters move closer together in frequency.

Typically, wireless communication frequencies can be divided into a low frequency band (e.g., approximately 698 MHz-approximately 960 MHz, LB), a middle frequency band (e.g., approximately 1427 MHz-approximately 2200 MHz, MB), a high frequency band (e.g., approximately 2300 MHz-approximately 2690 MHz, HB) and ultrahigh frequency band (e.g., approximately 3400 MHz-approximately 3600 MHz, UHB). The frequency bands may be cellular frequency bands, such as UMTS (Universal Mobile Telecommunications System) frequency bands described below in Table 1, or other non-UMTS frequency bands.

TABLE 1

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |

TABLE 1-continued

| Band | Mode | Tx Frequency Range (MHz) | Rx Frequency Range (MHz) |
|---|---|---|---|
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |
| B45 | TDD | 1,447-1,467 | 1,447-1,467 |
| B46 | TDD | 5,150-5,925 | 5,150-5,925 |
| B65 | FDD | 1,920-2,010 | 2,110-2,200 |
| B66 | FDD | 1,710-1,780 | 2,110-2,200 |
| B67 | FDD | N/A | 738-758 |
| B68 | FDD | 698-728 | 753-783 |

The high frequency band includes, but is not limited to, Band 40 (B40), Band 30 (B30), Band 41 (B41) and Band 7 (B7), etc. B41 is used in time division duplex (TDD) and thus has a single frequency band of approximately 2496 MHz to approximately 2690 MHz, which is utilized for both transmitted (Tx) and received (Rx) operations. Similarly, B40 is used in TDD and thus has a single frequency band of approximately 2300 MHz to approximately 2400 MHz. B41 and B40 can be utilized in cellular communications, e.g., 3rd generation partnership project (3GPP) wireless device. B7 is used in frequency division duplex (FDD) and thus performs simultaneous Tx and Rx operations via different frequencies, for example, Tx (approximately 2500 MHz to approximately 2570 MHz) and Rx (approximately 2620 MHz to approximately 2690 MHz) paths. This is typically accomplished by the use of a duplexer, which combines the Tx and Rx paths into a common terminal. B30 is also used in FDD and thus performs simultaneous Tx and Rx operations via different frequencies, for example, Tx (approximately 2305 MHz to approximately 2315 MHz) and Rx (approximately 2350 MHz to approximately 2360 MHz) paths.

The middle frequency band includes, but is not limited to, band 51 (B51) (e.g., approximately 1427 MHz-approximately 1432 MHz, TDD), band 74 (B74) (e.g., approximately 1427 MHz-approximately 1432 MHz and approximately 1475 MHz-approximately 1518 MHz, FDD), band 65 (B65) (e.g., approximately 1920 MHz-approximately 2010 MHz and approximately 2110 MHz-approximately 2200 MHz, FDD) etc. The 2.4 GHz Wi-Fi band has a frequency range of approximately 2403 MHz to approximately 2483 (or approximately 2483.5) MHz, which lies between B40 and B41 and can be utilized in wireless local area network (WLAN).

FIG. 1 illustrates an example of frequency bands that can be utilized in wireless communications, according to certain embodiments. For illustration purposes, the frequency range of approximately 1710 MHz to approximately 2400 MHz is illustrated as MB/HB 1 and the frequency range of approximately 2496 MHz to approximately 2690 MHz is illustrated as HB 2 in FIG. 1. Band B40 has a frequency range of approximately 2300 MHz to 2400 MHz, and Band B41 has a frequency range of approximately 2496 MHz to 2690 MHz. As illustrated in FIG. 1, a frequency gap between an upper channel of the MB/HB 1 band (specifically, an upper channel of B40) and a lower channel of Wi-Fi and is approximately 3 MHz. A frequency gap between an upper channel of Wi-Fi and a lower channel of the HB 2 band (specifically, B41) is approximately 13 MHz.

It will be appreciated that although the specific examples described herein relate to enabling the coexistence between 2.4 GHz Wi-Fi signals and adjacent frequency bands B40 and B41, features of the disclosure are not limited to such examples and may be applied to other adjacent frequency bands, e.g., to other Wi-Fi signals and their corresponding adjacent frequency bands. For example, similar principles may be applied when using the 5 GHz Wi-Fi band (ranging from approximately 5.15 GHz to approximately 5.85 GHz) and adjacent frequency band n79 (approximately 4.4 GHz to approximately 5.00 GHz), where the 5 GHz Wi-Fi band is separated from the n79 band by a frequency gap of approximately 15 MHz, or when using the 6 GHz Wi-Fi band (approximately 5.925 GHz to approximately 7.125 GHz) and adjacent frequency band B47 (approximately 5.855 GHz to 5.925 GHz), where there is effectively no frequency gap between the 6 GHz Wi-Fi band and the B47 band.

The implementation of the combination of Wi-Fi and cellular bands can be quite difficult on shared antenna systems that support both radio access technologies (RATs). This is because the frequency gap between these bands becomes quite small, as described above, such that the 2.4 GHz Wi-Fi is in extremely close proximity to the HB group, which includes bands both above (for example B41) and below (for example B40) the 2.4 GHz Wi-Fi band. Emissions and isolation between these bands for these RATs is a large challenge for attenuation, isolation, emissions and insertion loss. In particular, emissions due to an Adjacent Channel Leakage Ratio (ACLR), Spectrum Emission Mask (SEM) and out-of-band emissions should in certain cases be attenuated by more than approximately 35 to 40 dB to mitigate receive desense (RxDeSense) of the other RATs.

Some configurations use ganged band-pass filters in antenna plexers to facilitate isolation and merging of the various bands on to the common single antenna feed. An example switching circuit 200 is shown in the schematic diagram of FIG. 2, which can be implemented in, but is not limited to, a front end module, a front end configuration, a diversity receiver module, a multiple input multiple output (MiMo) module, etc.

Figure 2:
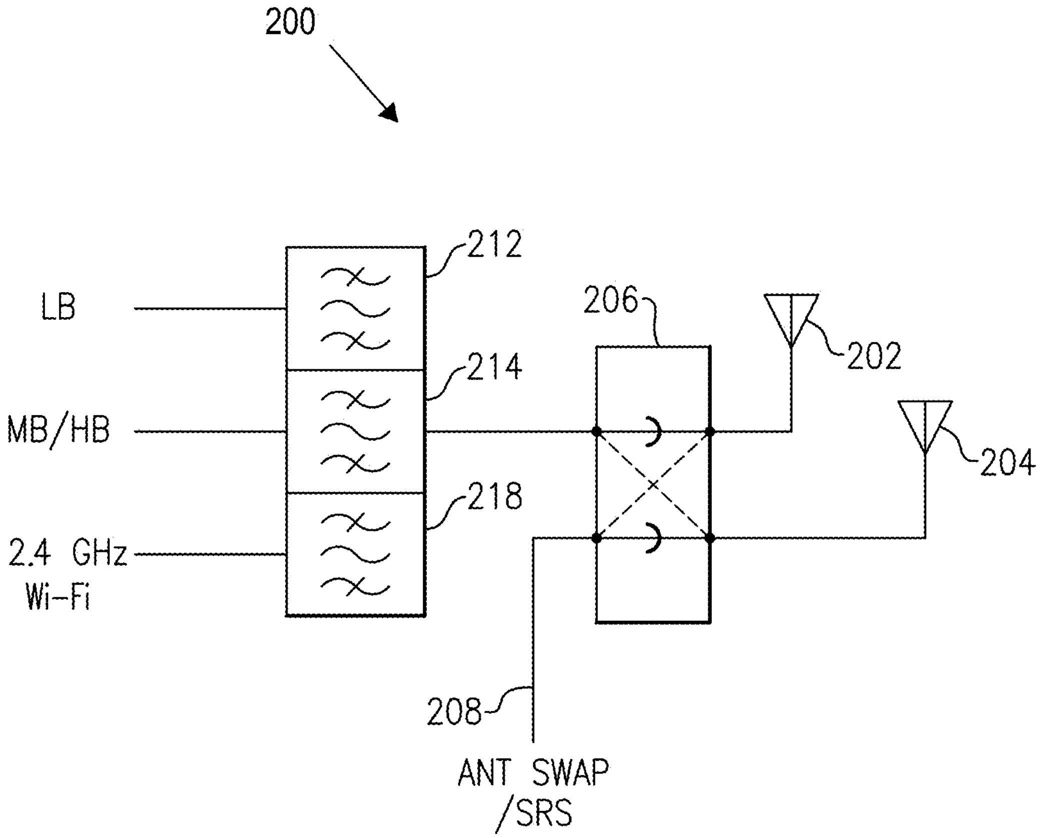
FIG.2 Prior Art
FIG. 2 is a schematic diagram of an example switching circuit that uses a ganged band-pass filter configuration in an antenna plexer.

The switching circuit 200 of FIG. 2 comprises antennas 202, 204 coupled to an antenna port, an antenna switch 206 which may be implemented on an antenna switching module (ASM), ganged filters 212, 214, 218, and control signal 208. The switching circuit 200 is configured to transmit an RF transmit signal to antennas 202, 204, receive an RF receive signal from the antennas 202, 204, and route the RF receive signal to receive circuitry such as the ganged pass-band filters 212, 214, 218 for subsequent downconversion and baseband processing. The RF receive signal may be received as an FDD signal and/or a TDD signal, and have a specific frequency band configuration. For example, the signals may include single-band signals having data modulated onto a single frequency band, multi-band signals (also referred to as inter-band carrier aggregation signals) having data modulated onto multiple frequency bands and/or data modulated onto multiple frequency bands using different communication protocols.

In the illustrated embodiment, the antenna switch 206 is configured to receive an antenna swapping signal through the control signal 208 from a baseband subsystem that includes a processor and/or is based at least in part on the frequency band configuration. The antenna switch 206 is configured to connect the appropriate antenna(s) 202, 204 with ganged filters 212, 214, 218 based on the antenna swapping signal. Further, a sounding reference signal (SRS) is transmitted to a base station through at least one of the antennas 202, 204. The base station may use the SRS for uplink frequency selective scheduling, such as SRS hopping supporting to be able to direct transmit signals to appropriate antennas 202, 204. The connection paths of the antenna switch 206 illustrated in FIG. 2 are for illustrative purposes only. The antenna switch 206 shown in the example of FIG. 2 may not be present in some other configurations. However, the use of antenna switch 206 can enable integration of post-antenna plexer switching.

The RF signals can include at least one of TDD and/or FDD signal. The switching circuit 200 utilizes a filter 212 for filtering LB signals transmitted to and received from at least one of the antennas 202, 204. The switching circuit 200 utilizes a filter 214 for filtering MB/HB signals transmitted to and received from at least one of the antennas 202, 204. In an embodiment, filter 214 comprises a ganged MB band pass filter and an HB band pass filter. In an alternative embodiment, filter 214 may be a dual-band filter configured to pass both MB band frequencies and HB band frequencies. In an embodiment, the MB comprises a frequency range of approximately 1710 MHz to approximately 2400 MHz and the HB comprises a frequency range of approximately 2496 MHz to approximately 2690 MHz. The switching circuit 200 utilizes a filter 218 for filtering the 2.4 GHz Wi-Fi band signals transmitted to and received from at least one of the antennas 202, 204.

In an embodiment, the filters 214, 218 can comprise band pass filter(s), whereas the filter 212 can comprise a low pass filter. The filters 212, 214, 218 can comprise surface acoustic wave (SAW) filters and/or bulk acoustic wave (BAW) filters. SAW and/or BAW devices utilize the piezoelectric effect to convert energy back and forth between the electrical and mechanical realms where the presence of an electrical field causes the material to deform and the application of a mechanical stress induces an electric charge.

As indicated above, it can be challenging to sufficiently attenuate OOB signals without suffering band edge insertion loss degradation for frequency bands that are in close proximity, such as where high frequency band B40 is relatively close to the low end of a 2.4 GHz Wi-Fi band and B41 is relatively close to the high end of the 2.4 GHz Wi-Fi band.

Embodiments of the disclosure mitigate such problems by providing a switching circuit that can reduce the operational bandwidth of the Wi-Fi and/or cellular RF bands to reduce insertion loss and improve isolation, as further described below.

A first embodiment of the disclosure enables reduced bandwidth for Wi-Fi signals by selecting either a high channel Wi-Fi band or a low channel Wi-Fi band.

Figure 3:
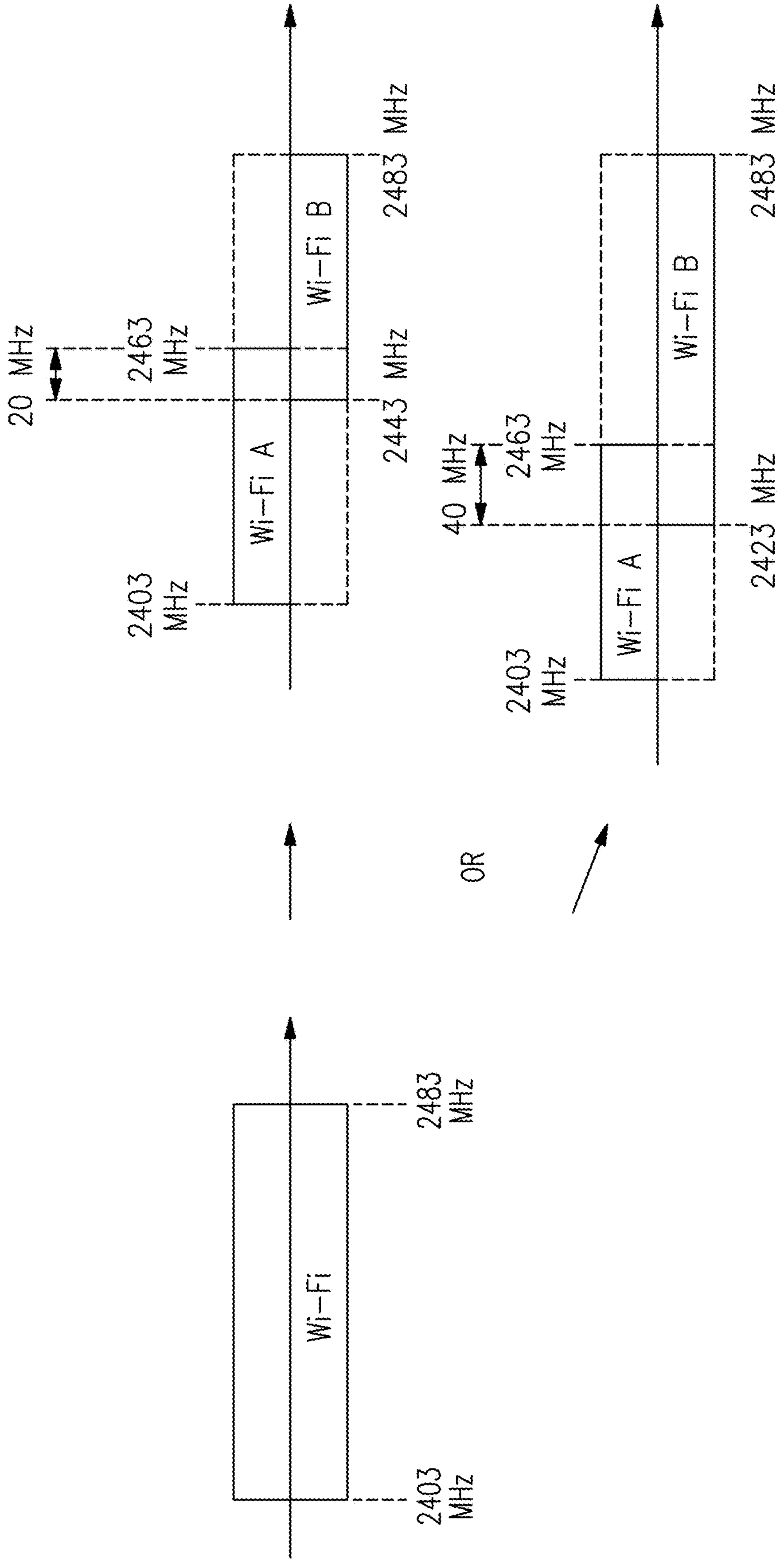
FIG. 3 is a schematic diagram showing how a 2.4 GHz Wi-Fi frequency band may be divided into two separate regions.

FIG. 3 illustrates an example of how the 2.4 GHz Wi-Fi frequency band may be divided into two regions partially overlapping each other. In the illustrated embodiment, the full Wi-Fi band spanning frequencies from 2403 MHz to 2483 MHz can be divided into two overlapping regions, Wi-Fi A and Wi-Fi B. In one aspect, the overlapping region can support at least a 20 MHz bandwidth channel. For example, Wi-Fi A can have a range of approximately 2403 MHz to 2463 MHz and Wi-Fi B can have a range of approximately 2443 MHz to 2483 MHz. In another aspect, the overlapping region can support at least a 40 MHz bandwidth channel. For example, Wi-Fi A can have a range of approximately 2403 MHz to 2463 MHz and Wi-Fi B can have a range of approximately 2423 MHz to 2483 MHz. The ranges of Wi-Fi A, Wi-Fi B and the overlapping region can vary based on the Wi-Fi standard or required channel bandwidth. Separating the full Wi-Fi band into sub-bands Wi-Fi A and Wi-Fi B facilitates a larger gap between an upper channel of the MB/HB 1 band (B40) and a lower channel of Wi-Fi band (sub-band Wi-Fi B), and a larger gap between an upper channel of Wi-Fi (sub-band Wi-Fi A) and a lower channel of the HB 2 band (B41, or B7 Tx), as shown in FIGS. 4A and 4B.

Figure 4A:
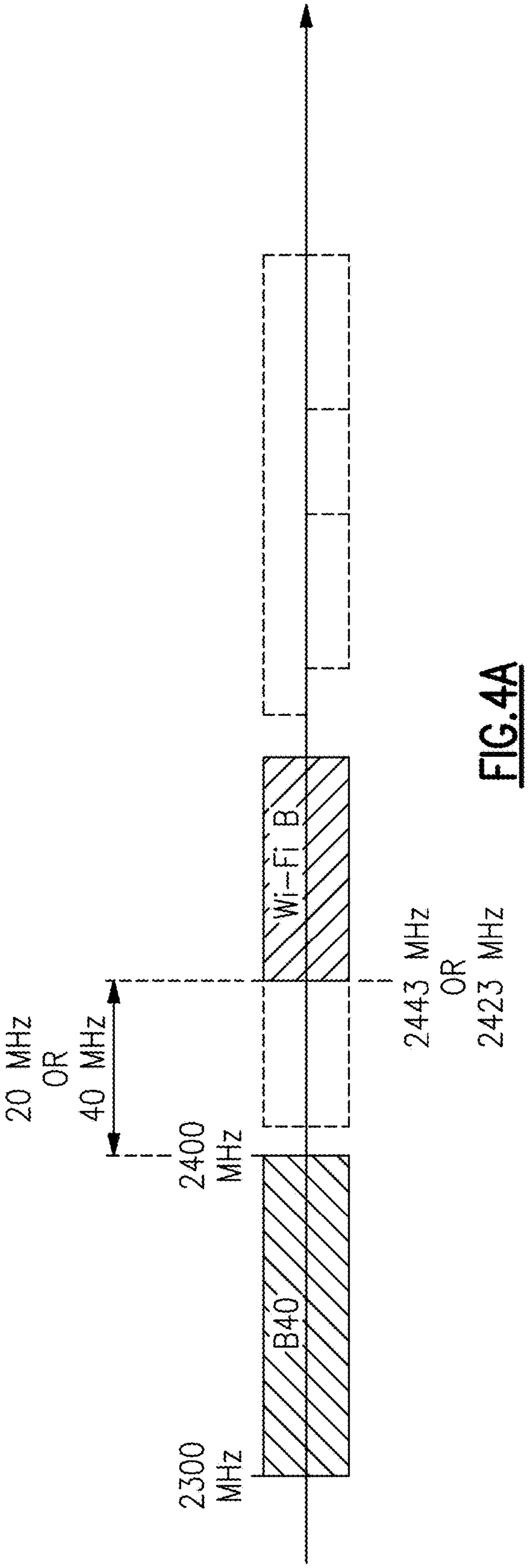
FIGS. 4A and 4B are schematic diagrams showing a first frequency band configuration and a second frequency band configuration.
Figure 4B:
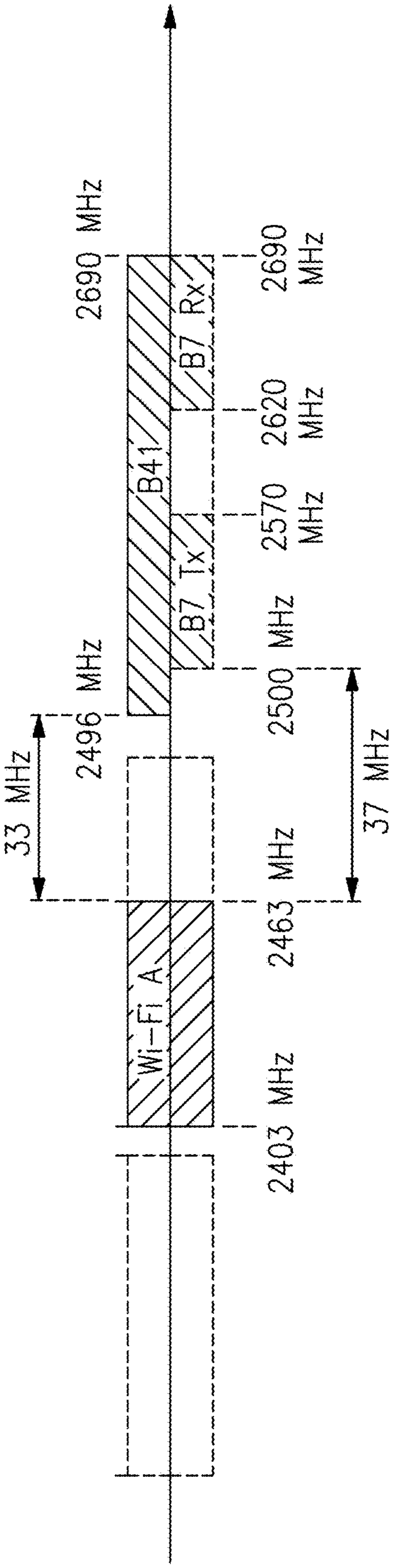

FIG. 4A illustrates an example of a frequency band configuration of B40 and sub-band Wi-Fi B without Wi-Fi A, B7 and B41. In this configuration, a gap between B40 and Wi-Fi B is approximately 20 MHz (when Wi-Fi B is selected as approximately 2423 MHz to 2483 MHz) or approximately 40 MHz (when Wi-Fi B is selected as approximately 2443 MHz to 2483 MHz). The gap between B40 and Wi-Fi B can vary depending on the division of the Wi-Fi band. FIG. 4B illustrates an example of a frequency band configuration of B41 and/or B7 Tx and sub-band Wi-Fi A without B40 and Wi-Fi B. In this configuration, a gap between B41 and Wi-Fi A is approximately 33 MHz and a gap between B7 Tx and Wi-Fi A is approximately 37 MHz. These band configurations provide a frequency offset gap that is larger than 3 MHz, resulting in better out of band attenuation and lower in-band insertion loss.

Accordingly, the 2.4 GHz Wi-Fi band may be split into two overlapping frequency regions which may each be provided with separate RF filter paths. The frequency overlap is variable and dependent on the implementation, but can support at least 20 MHz channel placements, and potentially 40 MHz channels as illustrated in FIG. 4A. This depends on the Wi-Fi a/b/g/n/x standard that is supported by the implementation. Advantageously, splitting the Wi-Fi band into two regions (region “A” with excellent performance for the lower Wi-Fi 2.4 GHz channels, and region “B” with excellent performance for the upper Wi-Fi 2.4 GHz channels) provides that each respective filter is narrower in bandwidth, but also provides better OOB attenuation, lower in-band insertion loss (IL), and also provides a larger gap in frequency offset between its band edges and the cellular bands.

Figure 5:
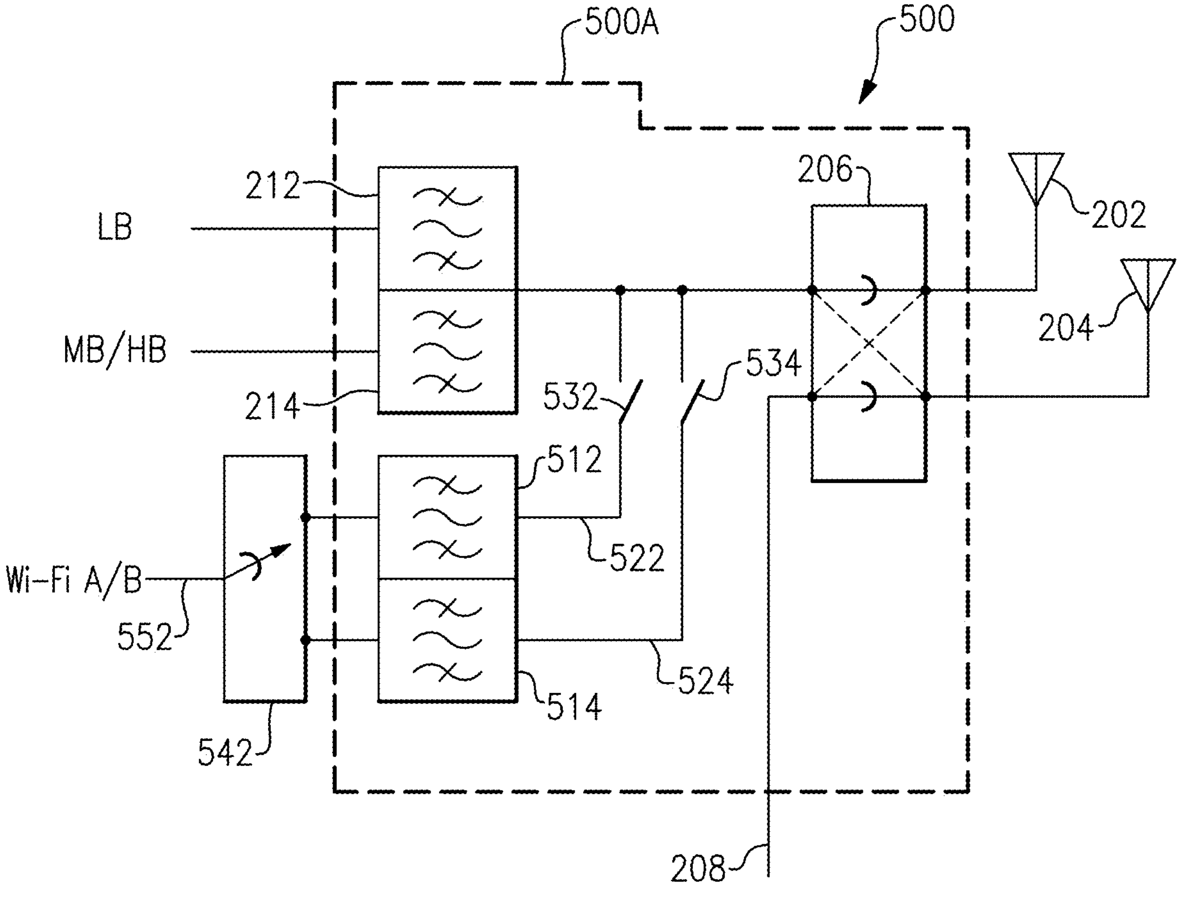
FIG. 5 is a schematic diagram of a first example switching circuit according to aspects of the present disclosure.

FIG. 5 is a schematic diagram of an embodiment of a switching circuit 500 configured to enable a signal to be routed through certain combinations of switches. The switching circuit 500 can be implemented in, but not limited to, a front end module, a front end configuration, a diversity receiver module, a multiple input multiple output (MiMo) module, etc.

In the illustrated embodiment, the switching circuit 500 comprises antennas 202, 204, a filtering circuit 500A comprising ASM 206, control signal 208, LB filter 212, and MB/HB 214 filters as described above. The filtering circuit 500A further comprises two Wi-Fi filters 512, 514 for filtering the 2.4 GHz Wi-Fi band signals transmitted to and received from at least one of the antennas 202, 204. Each filter 512, 514 is implemented on a respective Wi-Fi signal path 522, 524 that each includes a switch 532, 534 for selecting one or more of the Wi-Fi signal paths. Advantageously, switches 532, 534 also enable filters 512, 514 to be completely disconnected when Wi-Fi is not concurrently active thereby enabling much lower insertion loss due to the reduced loading of filters 212, 214.

Switching circuit 500 further comprises a Wi-Fi band select switch 542 that provides either the Wi-Fi A signal or Wi-Fi B signal to an output node on Wi-Fi signal path 552, and in some embodiments the Wi-Fi band select switch 542 can be a single-pole/multiple-throw (SPMT) switch as shown in FIG. 5. A control signal (not shown) determines the configuration of the switches 532, 534 and the Wi-Fi band select switch 542 in order to provide either the Wi-Fi A signal or the Wi-Fi B signal to the Wi-Fi signal path 552.

In the embodiment shown, the first filter 512 is configured to filter the low channel Wi-Fi band, e.g., Wi-Fi A having a range of approximately 2403 MHz to 2463 MHz, and the second filter 514 is configured to filter the high channel Wi-Fi band, e.g., Wi-Fi B having a range of approximately 2443 MHz to 2483 MHz or a range of approximately 2423 MHz to 2483 MHz. Switches 532, 534 are configured to switch-combine the appropriate Wi-Fi filter 512, 514 with the cellular LB filter 212 and/or cellular MB/HB filter 214 according to the received cellular frequency band and desired band separation, as described above. In some embodiments, the switches 532, 534 are implemented on the ASM 206.

In the embodiment shown in FIG. 5, the filters 212, 214 are implemented as ganged filters on a single switchless LB/MB/HB signal path while filters 512, 514 are implemented in separate signal paths that may be connected in parallel to the main LB/MB/HB signal path via switch 532 and switch 534 respectively. This configuration can prevent loading of the cellular RF signals by the Wi-Fi signals. However, it will be appreciated that in alternative embodiments each of the cellular filters 212, 214 and Wi-Fi filters 512, 514 may be provided on separate signal paths having respective switches to route a receive signal to at least one of the plurality of signal paths corresponding to the frequency band of the single-band or multi-band receive signal. In such embodiments, the Wi-Fi band select switch 542 is not included.

A second embodiment of the disclosure enables the use of a reduced bandwidth of cellular RF signals.

Figure 6:
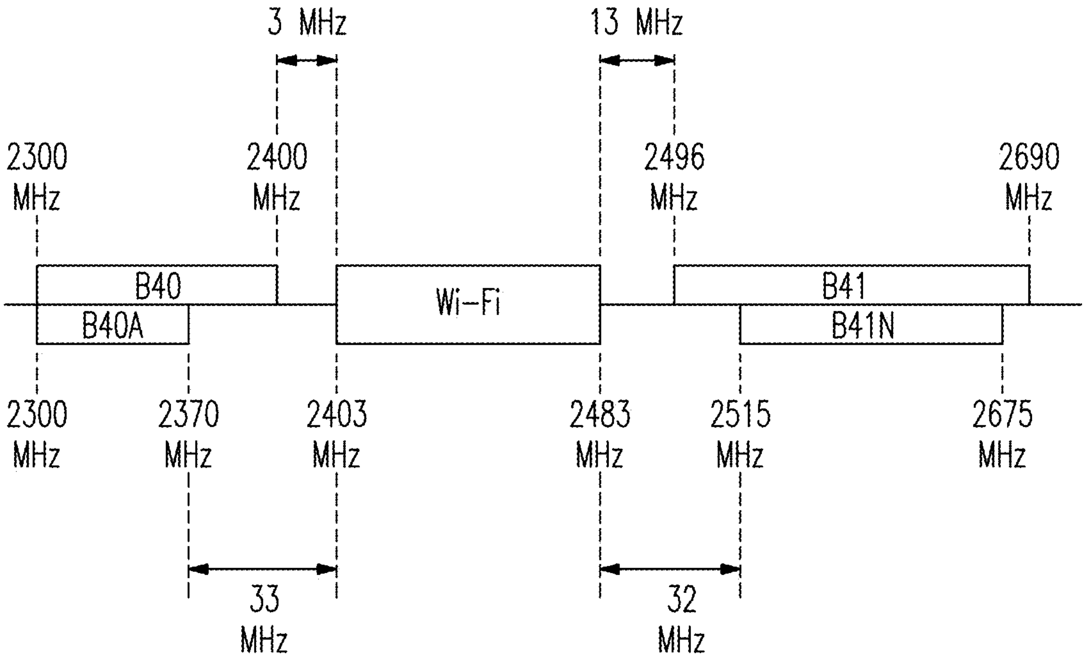
FIG. 6 is a schematic diagram showing the relative frequency separation between a 2.4 GHz Wi-Fi frequency band, a first frequency range and a second frequency range.

As discussed above, B40 and B41 are commonly used high frequency bands that coexist very close to the 2.4 GHz Wi-Fi band frequency range. FIG. 6 illustrates the relative separation between the 2.4 GHz Wi-Fi band and the conventional B40 and B41 bands as well as the relative separation between the 2.4 GHz Wi-Fi band and sub-bands B40A and B41N. As shown in FIG. 6, the 2.4 GHz Wi-Fi band has a frequency range of 2403 MHz to 2483 MHz, band B40 has a frequency range of 2300 MHz to 2400 MHz, and B41 has a frequency range of 2496 MHz to 2690 MHz. The gap between a lower channel of the Wi-Fi band and an upper channel of Band B40 is 3 MHz, and a gap between an upper channel of the Wi-Fi band and a lower channel of Band B41 is 13 MHz. As also shown in FIG. 6, Band B40A has a frequency range of 2300 MHz to 2370 MHz and Band B41N has a frequency range of 2515 MHz to 2675 MHz. Accordingly, a gap between a lower channel of Wi-Fi and an upper channel of B40A is 33 MHz, and a gap between an upper channel of Wi-Fi and a lower channel of B41N is 32 MHz.

As indicated above, using a band configuration of B40 and B41 with the 2.4 GHz Wi-Fi band results in a relatively small frequency offset gap of 3 MHz and 13 MHz respectively. However, the use of reduced bandwidth cellular bands B40A and B41N can provide a larger gap in frequency offset, resulting in better out of band attenuation and lower in-band insertion loss.

Figure 7:
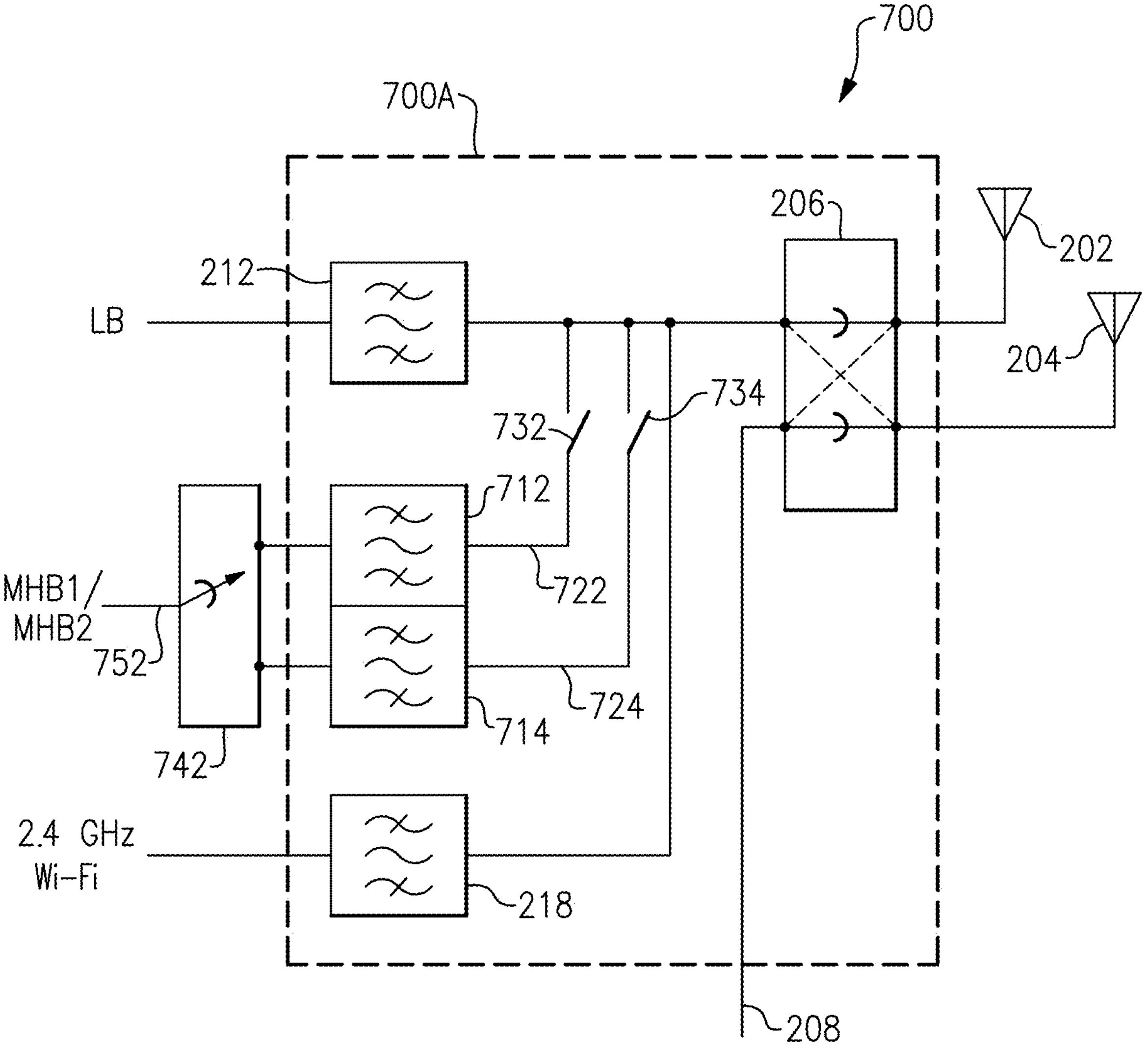
FIG. 7 is a schematic diagram of a second example switching circuit according to aspects of the present disclosure.

FIG. 7 is a schematic diagram of an embodiment of a switching circuit 700 configured to enable a signal to be routed through certain combinations of switches. The switching circuit 700 can be implemented in, but not limited to, a front end module, a front end configuration, a diversity receiver module, a multiple input multiple output (MiMo) module, etc.

In the illustrated embodiment, the switching circuit 700 comprises antennas 202, 204, filtering circuit 700A comprising ASM 206, control signal 208, LB cellular filter 212 and a 2.4 GHz Wi-Fi filter 218 as described above. The filtering circuit 700A further comprises two cellular filters 712, 714 for filtering the MB and HB signals transmitted to and received from at least one of the antennas 202, 204. Each filter 712, 714 is implemented on a respective cellular signal path 722, 724 that each includes a switch 732, 734 for selecting one or more of the cellular signal paths. Advantageously, switches 732, 734 also enable filters 512, 514 to be completely disconnected when MB/HB cellular signals are not active thereby enabling much lower insertion loss due to the reduced loading of filters 212, 218.

The switching circuit 700 further comprises a cellular band select switch 742 that provides the output from either filter 712 or 714 to an output node on cellular MB/HB signal path 752. Accordingly, the cellular band select switch 742 provides either a first, full bandwidth, RF signal MHB1 or a second, reduced bandwidth, RF signal MHB2 to the cellular signal path 752. In some embodiments, the first filter 712 is configured to pass frequencies in the range of between 1710 MHz to 2400 MHz and between 2496 MHz to 2690 MHz while the second filter 714 is configured to pass a reduced frequency range of between 1710 MHz to 2370 MHz and between 2515 MHz to 2675 MHz. In some embodiments, the first filter 712 is configured to filter at least bands B40 and B41 while the second filter 714 is configured to filter sub-bands B40A and B41N.

Switches 732, 734 are configured to switch-combine the appropriate MB/HB filter 712, 714 with the cellular LB filter 212 and 2.4 GHz Wi-Fi filter 218 according to whether the Wi-Fi band is being used and the desired band separation. In some embodiments the cellular band select switch 742 can be a single-pole/multiple-throw (SPMT) switch, as shown in FIG. 7. A control signal (not shown) may determine the configuration of the switches 732, 734 and the cellular band select switch in order to provide either the full bandwidth (e.g. B40 and B41) signal or the reduced bandwidth (e.g. B40A and B41N) signal to the cellular signal path 752.

In the embodiment shown in FIG. 7, the filters 212, 218 are implemented as switchless signal paths while filters 712, 714 are implemented in separate signal paths that may be connected in parallel to the LB signal path and Wi-Fi signal path via switches 732, 734 respectively. This configuration can prevent loading of the Wi-Fi signals by the cellular HB signals. However, it will be appreciated that in alternative embodiments each filter may be implemented on a separate signal path having a respective switch to route a receive signal to at least one of the plurality of signal paths that corresponds to the frequency band of the single-band or multi-band receive signal. In such embodiments, the cellular band select switch 742 is not included.

A third embodiment of the disclosure enables the reduction in bandwidth of either or both Wi-Fi and cellular RF signals.

Figure 8:
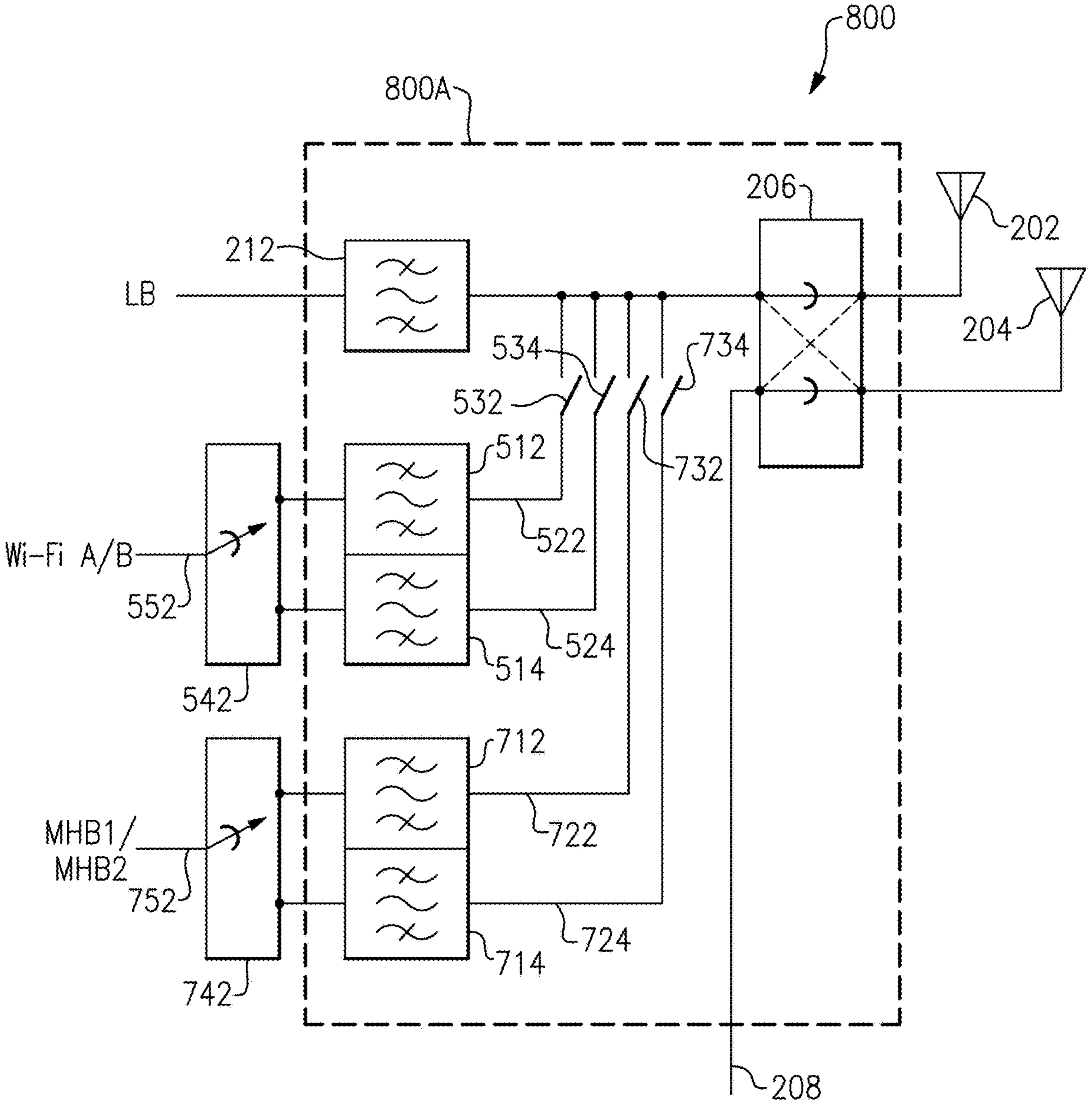
FIG. 8 is a schematic diagram of a third example switching circuit according to aspects of the present disclosure.

FIG. 8 is a schematic diagram of an embodiment of a switching circuit 800 comprising antennas 202, 204, filtering circuit 800A comprising ASM 206, control signal 208 and LB cellular filter 212 as described above. The filtering circuit 800A further comprises two Wi-Fi filters 512, 514 for filtering the 2.4 GHz Wi-Fi band signals and two cellular filters 712, 714 for filtering the MB and HB signals transmitted to and received from at least one of the antennas 202, 204.

As described above, each filter 512, 514, 712, 714 is implemented on a respective cellular signal path 522, 524, 722, 724 that each includes a switch 532, 534, 732, 734 for selecting one or more of the Wi-Fi or cellular signal paths. A Wi-Fi band select switch 542 provides either the Wi-Fi A signal or Wi-Fi B signal to a Wi-Fi signal path 552 while a cellular band select switch 742 provides either the full bandwidth MB/HB signal band (e.g. bands B40 and B41) or a reduced bandwidth MB/HB signal (e.g. sub-bands B40A and B41N) to cellular MB/HB signal path 752. Although filter 212 is implemented as a switchless signal path it will be appreciated that in alternative embodiments each filter may be implemented on a separate signal path having a respective switch to route a receive signal to at least one of the plurality of signal paths that corresponds to the frequency band of the single-band or multi-band receive signal.

The third embodiment advantageously enables optimization of the insertion loss and attenuation by selecting the appropriate Wi-Fi and/or cellular band signal path.

Figure 9:
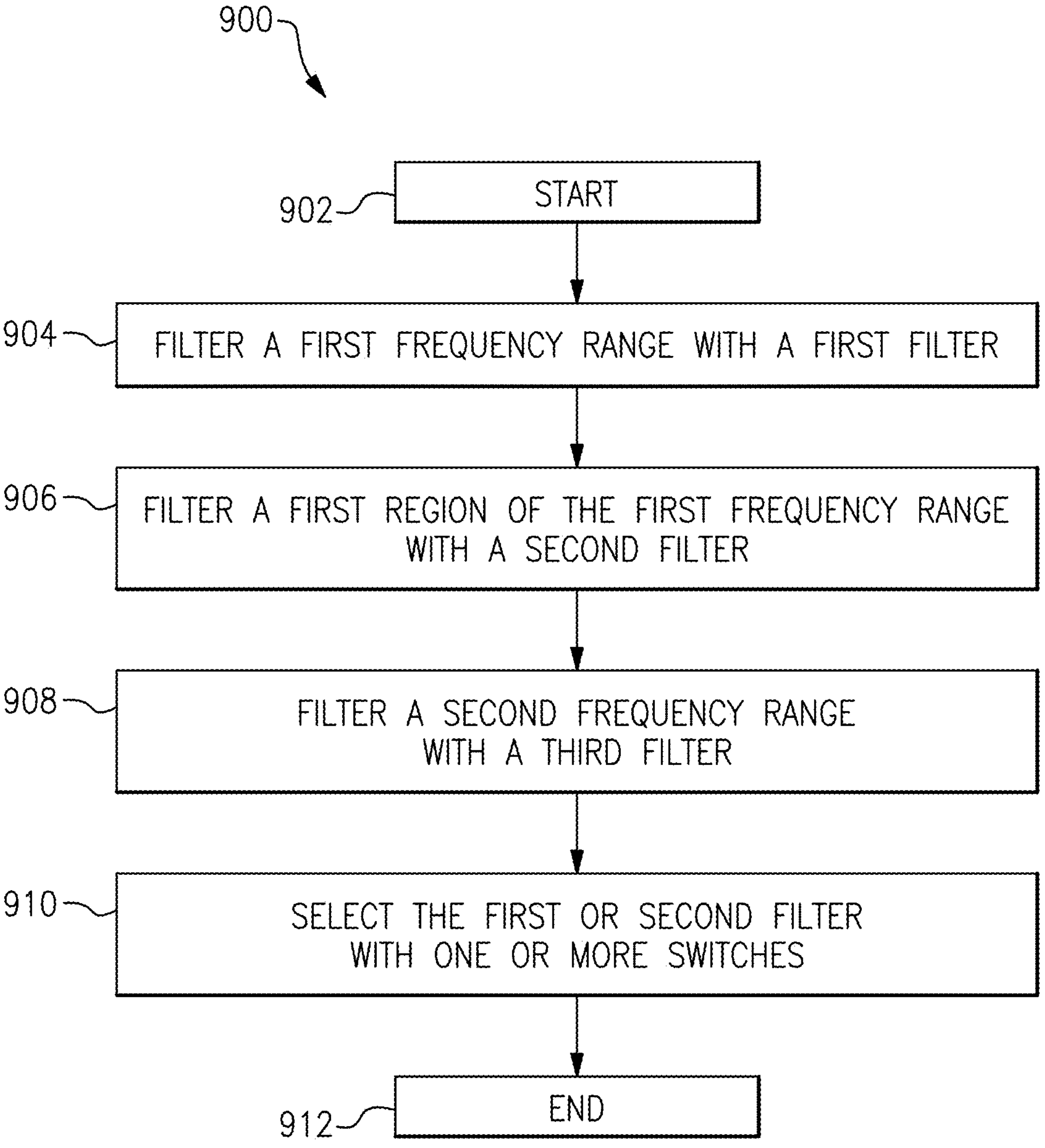
FIG. 9 is a schematic diagram of an example process for filtering radio-frequency signals.

FIG. 9 shows an example method 900 that can be implemented by a switching circuit to filter received radio-frequency signals as described herein. In a first step 902 the process starts. In a second step 904 the switching circuit filters a first frequency range with a first filter. In a third step 906 the switching circuit filters a first region of the first frequency range with a second filter. In a fourth step 908 the switching circuit filters a second frequency range with a third filter. In a fifth step 910 the switching circuit selects the first filter or the second filter based on a control signal using one or more switches. The process ends at a final step 912.

Figure 10A:
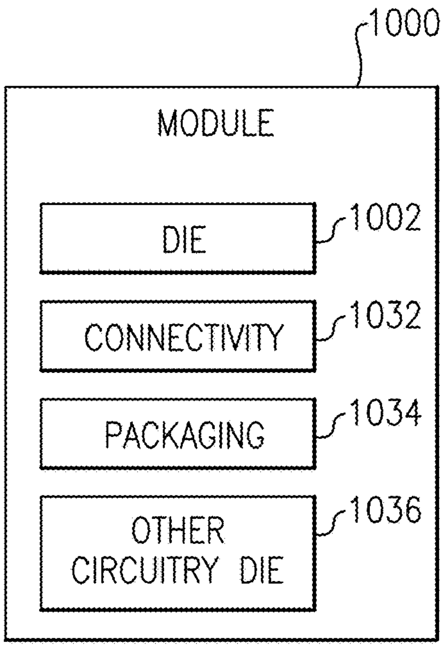
FIGS. 10A-10C show features of the present disclosure implemented on radio-frequency modules.
Figure 10B:
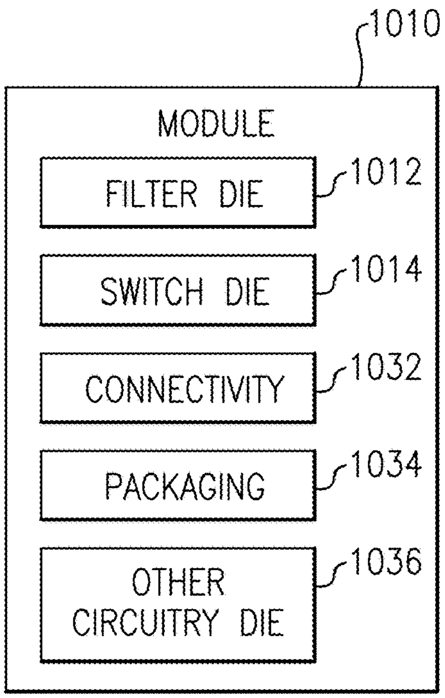
Figure 10C:
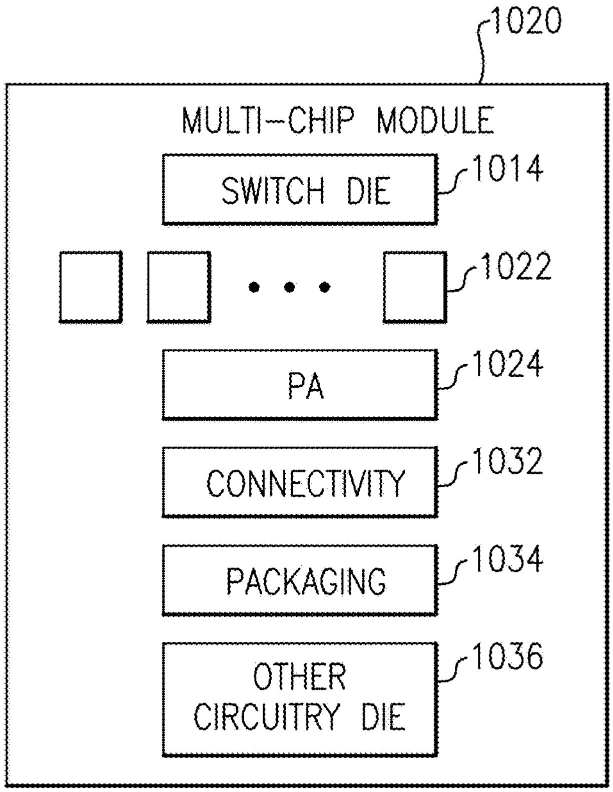

FIG. 10A is an exemplary block diagram of switching module 1000. In the illustrated embodiment, a multimode semiconductor die 1002 can include one or more of the switching circuits 500, 700, 800 of FIGS. 5, 7, and 8 respectively, that include filtering circuits 500A, 700A and 800A and switches 552, 752. FIG. 10B is an exemplary block diagram of a multi-chip switching module 1010. In an embodiment, filter circuits 500A, 700A and 800A may be implemented on a filter die 1012 while switches 552, 752 may be implemented on switch die 1014. FIG. 10C is an exemplary block diagram of a multi-chip switching module 1020 including the switch die 1014 and a plurality of SAW or BAW filters 1022, which can form some or all of the filters in the filter circuits 500A, 700A, 800A. The multi-chip module 1020 can further include power amplifier (PA) circuitry 1024.

The modules 1000, 1010, 1020 can further include connectivity 1032 to provide signal interconnections, packaging 1034, such as for example, a package substrate, for packaging of the circuitry, and other circuitry die 1036, such as, for example amplifiers, pre-filters, post filters modulators, demodulators, down converters, and the like, as would be known to one of skill in the art of semiconductor and multi-chip module fabrication in view of the disclosure herein.

Figure 11:
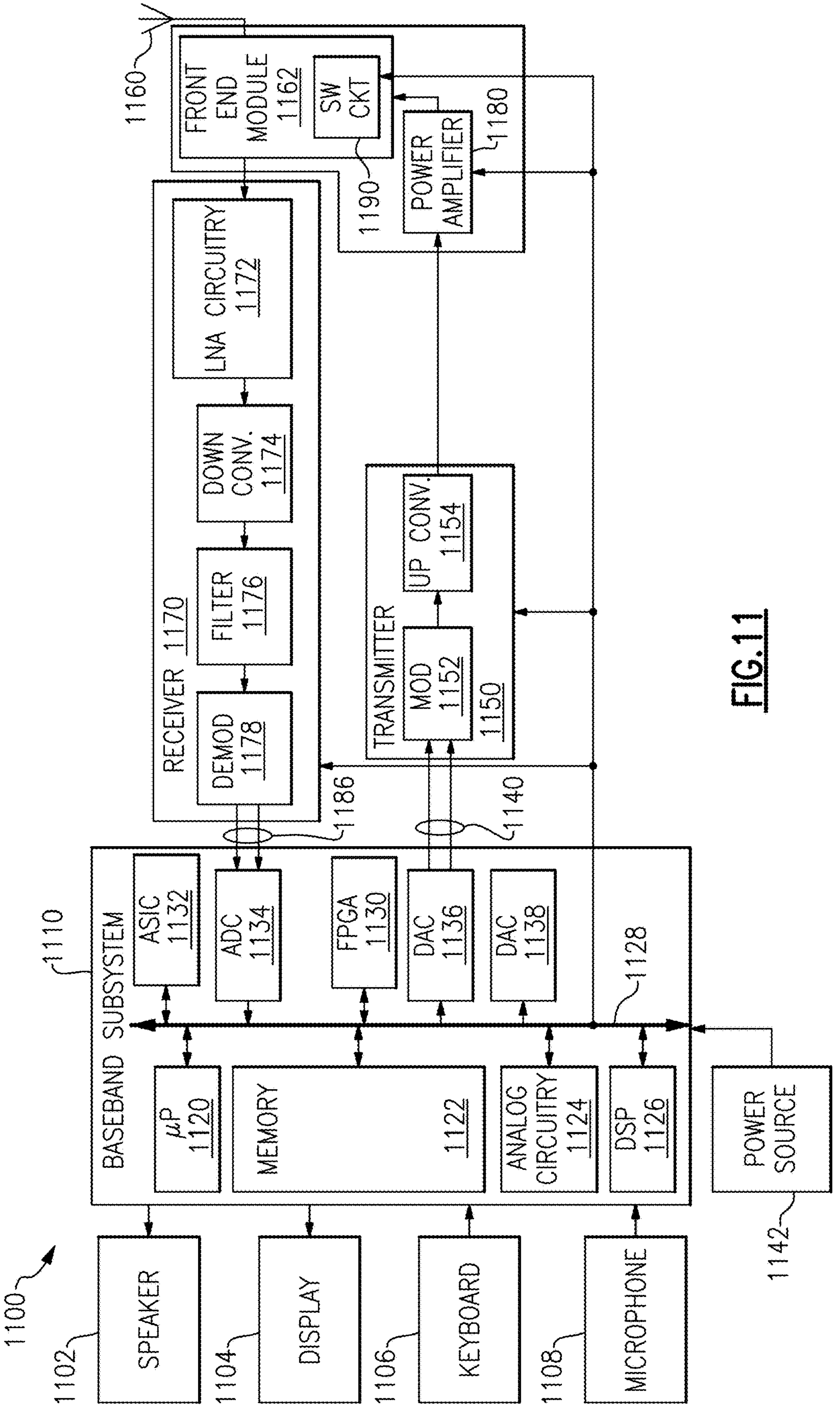
FIG. 11 is a schematic diagram of a wireless device that includes one or more of the radio-frequency modules of FIGS. 10A-10C.

FIG. 11 is an exemplary block diagram illustrating a simplified wireless device 1100. The wireless device 1100 can include one or more of the switching circuits 500, 700, 800 of FIGS. 5, 7, and 8, respectively, for example.

The wireless device 1100 includes a speaker 1102, a display 1104, a keyboard 1106, and a microphone 1108, all connected to a baseband subsystem 1110. A power source 1142, which may be a direct current (DC) battery or other power source, is also connected to the baseband subsystem 1110 to provide power to the wireless device 1100. In a particular embodiment, the wireless device 1100 can be, for example but not limited to, a portable telecommunication device such as a mobile cellular-type telephone. The speaker 1102 and the display 1104 receive signals from baseband subsystem 1110, as known to those skilled in the art. Similarly, the keyboard 1106 and the microphone 1108 supply signals to the baseband subsystem 1110. The baseband subsystem 1110 includes a microprocessor (μP) 1120, memory 1122, analog circuitry 1124, and a digital signal processor (DSP) 1126 in communication via bus 1128. Bus 1128, although shown as a single bus, may be implemented using multiple busses connected as necessary among the subsystems within the baseband subsystem 1110. The baseband subsystem 1110 may also include one or more of an application specific integrated circuit (ASIC) 1132 and a field programmable gate array (FPGA) 1130.

The microprocessor 1120 and memory 1122 provide the signal timing, processing, and storage functions for wireless device 1100. The analog circuitry 1124 provides the analog processing functions for the signals within baseband subsystem 1110. The baseband subsystem 1110 provides control signals to a transmitter 1150, a receiver 1170, a power amplifier 1180, and a switching module 1190, for example.

It should be noted that, for simplicity, only the basic components of the wireless device 1100 are illustrated herein. The control signals provided by the baseband subsystem 1110 control the various components within the wireless device 1100. Further, the function of the transmitter 1150 and the receiver 1170 may be integrated into a transceiver.

The baseband subsystem 1110 also includes an analog-to-digital converter (ADC) 1134 and digital-to-analog converters (DACs) 1136 and 1138. In this example, the DAC 1136 generates in-phase (I) and quadrature-phase (Q) signals 1140 that are applied to a modulator 1152. The ADC 1134, the DAC 1136, and the DAC 1138 also communicate with the microprocessor 1120, the memory 1122, the analog circuitry 1124, and the DSP 1126 via bus 1128. The DAC 1136 converts the digital communication information within baseband subsystem 1110 into an analog signal for transmission to the modulator 1152 via connection 1140. Connection 1140, while shown as two directed arrows, includes the information that is to be transmitted by the transmitter 1150 after conversion from the digital domain to the analog domain.

The transmitter 1150 includes the modulator 1152, which modulates the analog information on connection 1140 and provides a modulated signal to upconverter 1154. The upconverter 1154 transforms the modulated signal to an appropriate transmit frequency and provides the upconverted signal to the power amplifier 1180. The power amplifier 1180 amplifies the signal to an appropriate power level for the system in which the wireless device 1100 is designed to operate.

Details of the modulator 1152 and the upconverter 1154 have been omitted, as they will be understood by those skilled in the art. For example, the data on connection 1140 is generally formatted by the baseband subsystem 1110 into in-phase (I) and quadrature (Q) components. The I and Q components may take different forms and be formatted differently depending upon the communication standard being employed.

The power amplifier 1180 supplies the amplified signal to a front-end module 1162, where the amplified signal is conditioned and filtered by one or more signal conditioning filters for transmission. The front end module 1162 comprises an antenna system interface that may include, for example, the switching circuit 1190 configured to switch a signal between the antenna 1160, the receiver 1170, and the power amplifier 1180 (receiving the RF transmit signal from the transmitter 1150), as described herein to implement FDD and TDD in a shared band. For example, the switching circuit 1190 can include one or more of the switching circuits 500, 700, 800 of FIGS. 5, 7, and 8, respectively. The RF transmit signal is supplied from the front-end module 1162 to the antenna 1160. In an embodiment, the antenna 1160 comprises an FDD/TDD antenna.

In an embodiment, the switching circuit 1190 comprises the switching module 1000 including the semiconductor die 1002. In another embodiment, switching circuit 1190 comprises the switching module 1010 including the filtering semiconductor die 1012 and the switching semiconductor die 1014. In a further embodiment, the switching circuit 1190 comprises the multi-chip module 1020 including one or more SAW or BAW filters 1022 and the switching semiconductor die 1014. In such embodiments, the switching circuit 1190 can comprises one or more of the switching circuits 500, 700, 800 of FIGS. 5, 7, and 8, respectively.

A signal received by antenna 1160 will be directed from the front-end module 1162 to the receiver 1170. The receiver 1170 includes low noise amplifier circuitry 1172, a downconverter 1174, a filter 1176, and a demodulator 1178.

If implemented using a direct conversion receiver (DCR), the downconverter 1174 converts the amplified received signal from an RF level to a baseband level (DC), or a near-baseband level (approximately 100 kHz). Alternatively, the amplified received RF signal may be downconverted to an intermediate frequency (IF) signal, depending on the application. The downconverted signal is sent to the filter 1176. The filter 1176 comprises a least one filter stage to filter the received downconverted signal as known in the art.

The filtered signal is sent from the filter 1176 to the demodulator 1178. The demodulator 1178 recovers the transmitted analog information and supplies a signal representing this information via connection 1186 to the ADC 1134. The ADC 1134 converts these analog signals to a digital signal at baseband frequency and transfers the signal via bus 1128 to the DSP 1126 for further processing.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Throughout the description and the claims, the words "comprise," "comprising," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of certain embodiments is not intended to be exhaustive or to limit the invention to the precise form disclosed above. While specific embodiments of, and examples for, the invention are described above for illustrative purposes, various equivalent modifications are possible within the scope of the invention, as those ordinary skilled in the relevant art will recognize in view of the disclosure herein.

For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. In addition, while processes or blocks are at times shown as being performed in series, these processes or blocks may instead be performed in parallel, or may be performed at different times.

The teachings of the invention provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A radio-frequency switching circuit, comprising:

a first signal path for a first frequency range;

a second signal path for a second frequency range, the first and second frequency ranges being adjacent to each other;

first signal path filters each configured to pass a respective region of the first frequency range, the first signal path filters including a first filter and a second filter, the respective region of the first filter including a first band and a second band that are separate from each other in frequency, the respective region of the second filter including a sub-band of the first band and a sub-band of the second band such that the second filter has a reduced bandwidth relative to the first filter;

second signal path filters each configured to pass a respective region of the second frequency range, the respective regions being smaller than the second frequency range and being between the first band and the second band, the second signal path filters including a third filter and a fourth filter, the respective region of the third filter having a larger gap in frequency offset from the first band than the fourth filter, and the respective region of the fourth filter having a larger gap in frequency offset from the second band than the third filter; and one or more switches configured to select one of the first signal path filters and one of the second signal path filters based on a control signal, and to connect the selected one of the first signal path filters with the selected one of the second signal path filters.

2. The radio-frequency switching circuit of claim 1 wherein the first band and the second band are used for cellular communication, and the second frequency range includes a frequency band used for wireless local area network signal communication.

3. The radio-frequency switching circuit of claim 1 wherein the first frequency range is separated from the second frequency range by a frequency gap that is smaller than or equal to approximately 15 MHz.

4. The radio-frequency switching circuit of claim 1 wherein the region of the first frequency range corresponding to the selected first signal path filter is separated from the second frequency range by a frequency gap that is greater than or equal to 20 MHz.

5. The radio-frequency switching circuit of claim 1 wherein the region of the second frequency range corresponding to the selected second signal path filter is separated from the first frequency range by a frequency gap that is greater than or equal to 20 MHz.

6. The radio-frequency switching circuit of claim 1 further comprising a low pass filter, the one or more switches configured to connect the selected one of the first signal path filters and the selected one of the second signal path filters to the low pass filter.

7. A radio-frequency module comprising:

a packaging substrate configured to receive a plurality of components; and a semiconductor die implemented on the packaging substrate, the semiconductor die including the radio-frequency switching circuit of claim 1.

8. A wireless device including the radio-frequency module of claim 7 the wireless device further including antennas, an antenna switch module coupled between the one or more switches and the antennas, and a controller configured to provide a control signal to the radio-frequency switching circuit of the radio-frequency module.

9. The radio-frequency switching circuit of claim 1 wherein one or more switches are configured to disconnect all of the first signal path filters from the selected one of the second signal path filters when the first signal path is inactive.

10. The radio-frequency switching circuit of claim 1 wherein the one or more switches are configured to disconnect all of the second signal path filters from the selected one of the first signal path filters when the second signal path is inactive.

11. The radio-frequency switching circuit of claim 1 wherein the second frequency range corresponds to a Wi-Fi band.

12. A radio-frequency switching circuit for multiple signal bands, comprising:

a first signal path for a first frequency range;

a second signal path for a second frequency range, the first and second frequency ranges being adjacent to each other;

first signal path filters including a first filter and a second filter, the first filter configured to pass a first band and a second band within the first frequency range, and the second filter configured to pass a sub-band of the first band and a sub-band of the second band such that the second filter has a reduced bandwidth relative to the first filter;

a second signal path filter configured to pass a region of the second frequency range that is between the first band and the second band, the region having a larger gap in frequency offset from the sub-band of the first band than the first band, and having a larger gap in frequency offset from the sub-band of the second band than the second band; and one or more switches configured to select one of the first signal path filters based on a control signal and to connect the selected one of the first signal path filters to the second signal path filter.

13. The radio-frequency switching circuit of claim 12 wherein the first band and the second band are cellular bands.

14. The radio-frequency switching circuit of claim 13 wherein the second frequency range corresponds to a Wi-Fi band.

15. The radio-frequency switching circuit of claim 12 wherein the one or more switches are configured to disconnect all of the first signal path filters from the second signal path filter when the first signal path is inactive.

16. The radio-frequency switching circuit of claim 12 wherein the first frequency range is separated from the second frequency range by a frequency gap that is smaller than or equal to 15 MHz.

17. The radio-frequency switching circuit of claim 16 wherein the region of the second frequency range is separated from the sub-band of the first band by at least 20 MHz.

18. The radio-frequency switching circuit of claim 12 further comprising a low pass filter, the one or more switches configured to connect the selected one of the first signal path filters to the low pass filter.

19. A radio-frequency module comprising:

a packaging substrate configured to receive a plurality of components; and a semiconductor die implemented on the packaging substrate, the semiconductor die including a radio-frequency switching circuit, the radio-frequency switching circuit including a first signal path for a first frequency range; a second signal path for a second frequency range, the first and second frequency ranges being adjacent to each other; first signal path filters including a first filter and a second filter, the first filter configured to pass a first band and a second band within the first frequency range, and the second filter configured to pass a sub-band of the first band and a sub-band of the second band such that the second filter has a reduced bandwidth relative to the first filter; a second signal path filter configured to pass a region of the second frequency range that is between the first band and the second band, the region having a larger gap in frequency offset from the sub-band of the first band than the first band, and having a larger gap in frequency offset from the sub-band of the second band than the second band; and one or more switches configured to select one of the first signal path filters based on a control signal and to connect the selected one of the first signal path filters to the second signal path filter.

20. A wireless device comprising the radio-frequency module of claim 19, antennas, an antenna switch module coupled between the one or more switches and the antennas, and a controller configured to provide a control signal to the radio-frequency switching circuit of the radio-frequency module.

* * * * *